(12) United States Patent
Liao et al.

(10) Patent No.: US 10,012,882 B2
(45) Date of Patent: Jul. 3, 2018

(54) LIQUID CRYSTAL DISPLAY PANEL

(71) Applicant: Shenzhen China Star Optoelectronics Technology Co., Ltd., Shenzhen, Guangdong (CN)

(72) Inventors: Zuomin Liao, Guangdong (CN); Bing Han, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 160 days.

(21) Appl. No.: 14/417,681

(22) PCT Filed: Jan. 20, 2015

(86) PCT No.: PCT/CN2015/071117
§ 371 (c)(1),
(2) Date: May 5, 2016

(87) PCT Pub. No.: WO2016/095316
PCT Pub. Date: Jun. 23, 2016

(65) Prior Publication Data
US 2016/0246144 A1    Aug. 25, 2016

(30) Foreign Application Priority Data

Dec. 19, 2014  (CN) .......................... 2014 1 0799546

(51) Int. Cl.
*G02F 1/1362* (2006.01)

(52) U.S. Cl.
CPC .............. *G02F 1/136286* (2013.01); *G02F 2001/136295* (2013.01); *G02F 2201/18* (2013.01); *G09G 2300/0426* (2013.01); *G09G 2320/0223* (2013.01); *G09G 2320/0242* (2013.01)

(58) Field of Classification Search
CPC .. G02F 1/136286; G02F 2001/136295; G09G 2300/0426; G09G 2320/0223; G09G 2320/0242
See application file for complete search history.

(56) References Cited

U.S. PATENT DOCUMENTS

| 2007/0216845 | A1 | 9/2007 | Liao |
| 2012/0268476 | A1* | 10/2012 | Park ................ G09G 3/3607 345/589 |
| 2014/0158401 | A1* | 6/2014 | Shih ................ H05K 1/025 174/250 |

FOREIGN PATENT DOCUMENTS

| CN | 101071206 A | 11/2007 |
| CN | 101359142 A | 2/2009 |
| CN | 101510383 A | 8/2009 |

(Continued)

OTHER PUBLICATIONS

International Search Report and Written Opinion, China, dated Jan. 19, 2015.

*Primary Examiner* — Angela Davison
(74) *Attorney, Agent, or Firm* — Kim Winston LLP

(57) ABSTRACT

A liquid crystal display panel and a method for manufacturing the same are disclosed. The liquid crystal display panel comprises a data driving module; data lines arranged in an active area in parallel with one another; and data wirings arranged in a fanout area, one end of each data wiring being connected with an output end of said data driving module, the other end thereof being connected with a data line of said active area, wherein the data lines in said active area are arranged to have different widths.

4 Claims, 3 Drawing Sheets

(56) References Cited

FOREIGN PATENT DOCUMENTS

| CN | 103033960 | * | 4/2013 | ......... G02F 1/13452 |
|---|---|---|---|---|
| CN | 103033960 A | | 4/2013 | |
| JP | 1993072563 A | | 3/1993 | |

* cited by examiner

LIQUID CRYSTAL DISPLAY PANEL

CROSS REFERENCE TO RELATED APPLICATION

The present application claims benefit of Chinese patent application CN 201410799546.8, entitled "Liquid Crystal Display Panel" and filed on Dec. 19, 2014, which is incorporated herein by reference.

FIELD OF THE INVENTION

The present disclosure relates to the technical field of liquid crystal display, and particularly to a liquid crystal display panel that can alleviate the color shift phenomenon, and a manufacturing method thereof.

BACKGROUND OF THE INVENTION

The liquid crystal display device, especially the Thin Film Transistor Liquid Crystal Display (TFT-LCD) has been widely used in computers, flat televisions, mobile phones and other information products due to its outstanding performance. During design and production of liquid crystal display panel, how to avoid the color shift phenomenon is an important challenge faced by the Research & Development personnel. The color shift phenomenon means that the colors displayed in an image containing multiple colors are non-uniform when the image is presented, and the image would contain more ingredients of a certain color. For example, when an image with the yellow color as a whole is presented, some areas would look red. There are many reasons for the color shift phenomenon of the liquid crystal display device. For instance, the poor quality of the video signal lines (data lines) or the poor contact thereof would result in serious color shift problems.

The present disclosure mainly discusses the color shift problem resulted from the delay effect of the data wirings. In the liquid crystal display panel, pixel units are arranged on an array substrate in a form of a matrix array, and a data driving module outputs data signal voltages representing the image information to the pixel units through data lines. A pixel electrode of each pixel unit is charged with a corresponding electric potential according to the data signal voltage transmitted from the data line, and the charging effect thereof can be measured by a charge rate. In this case, the pixel electrode drives corresponding liquid crystal molecules to deflect, whereby light can transmit, so that the image information can be presented. Since the data wirings have a certain impedance, which is equivalent to an RC network in series connection, a certain delay distortion must occur to the data signal voltage during transmission, and thus the electric potential of the pixel electrode of the pixel unit cannot completely reach an electric potential of the data signal voltage output by the data driving module. In general, the larger the equivalent resistance value and capacitance value of the data wirings are, the lower the charge rate of the pixel electrode would become if other factors are not taken into consideration. In addition, in the liquid crystal display device, since the liquid crystal molecules are generally driven by alternating current, an inversion between high-level voltage and low-level voltage exists in the data signal voltage output to the pixel unit by the data driving module. During this procedure, a waveform of the data signal voltage of the pixel electrodes in an upper row of the active area is better than a waveform of the data signal voltage of the pixel electrodes in a lower row of the active area due to the delay effect of the data wirings (as shown in FIG. 1). In this case, the charge rate of the pixel units in the upper row is higher than that of the pixel units in the lower row, and thus the brightness of the pixel units in the upper row is higher than that of the pixel units in the lower row.

In a word, the charge rates of the pixel units in different regions of the active area of the liquid crystal display panel would be different due to the delay effect of the wirings, and thus the degrees of brightness, the picture contrasts, and the color mixture effects of the pixel units in different regions are all different. In particular, when the impedance of the data lines in a right side and a left side of the liquid crystal display panel is far different from that of the data lines in a central part of the liquid crystal display panel, the serious color shift phenomenon as described hereinabove would occur.

SUMMARY OF THE INVENTION

The present disclosure aims to provide a liquid crystal display panel that can alleviate the color shift phenomenon, and a method for manufacturing the same.

The present disclosure provides a liquid crystal display panel, comprising: a data driving module; data lines arranged in an active area in parallel with one another; and data wirings arranged in a fanout area, one end of each data wiring being connected with an output end of said data driving module, the other end thereof being connected with a data line of said active area. The data lines in said active area have different widths.

According to one embodiment of the present disclosure, the widths of the data lines in said active area increase gradually from a central part of the active area to a right side and a left side of the active area.

Further, the widths of the data lines in said active area increase uniformly.

According to another embodiment of the present disclosure, the widths of the data lines in said active area decrease gradually from a central part of the active area to a right side and a left side of the active area.

Further, the widths of the data lines in said active area decrease uniformly.

According to a third embodiment of the present disclosure, the width of each of the data lines arranged in a right side and a left side of the active area decreases gradually along a direction from an upper end of the active area to a lower end of the active area, while the width of each of the data lines arranged in a central part of the active area increases gradually along the direction from the upper end of the active area to the lower end of the active area.

Further, the width of each of the data lines arranged in the right side and the left side of the active area decreases uniformly, and the width of each of the data lines arranged in the central part of the active area increases uniformly.

Accordingly, the present disclosure further provides a method for manufacturing the above liquid crystal display panel, comprising the following steps: arranging data lines of different widths in parallel with one another in an active area; and arranging data wirings in a fanout area, so that one end of each data wiring is connected with an output end of said data driving module, and the other end thereof is connected with a data line of said active area.

According to a specific embodiment of the present disclosure, the widths of the data lines in said active area increase gradually from a central part of the active area to a right side and a left side of the active area.

Preferably, the widths of the data lines in said active area increase uniformly.

According to a specific embodiment of the present disclosure, the widths of the data lines in said active area decrease gradually from a central part of the active area to a right side and a left side of the active area.

Preferably, the widths of the data lines in said active area decrease uniformly.

According to a specific embodiment of the present disclosure, the width of each of the data lines arranged in a right side and a left side of the active area decreases gradually along a direction from an upper end of the active area to a lower end of the active area, while the width of each of the data lines arranged in a central part of the active area increases gradually along the direction from the upper end of the active area to the lower end of the active area.

Preferably, the width of each of the data lines arranged in the right side and the left side of the active area decreases uniformly, and the width of each of the data lines arranged in the central part of the active area increases uniformly.

Compared with the prior art, one embodiment or a plurality of embodiments according to the present disclosure may have the following advantages or beneficial effects.

According to the present disclosure, under the condition that the data wirings in the fanout area of the liquid crystal display panel cannot be changed due to the limited space thereof, the impedance difference between the data lines in the right side and the left side of the liquid crystal display panel and the data lines in the central part of the liquid crystal display panel can be reduced effectively through arranging data lines with different widths which change gradually in the active area to substitute the traditional data lines with the same width, and thus the color shift phenomenon of the liquid crystal display panel can be alleviated.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

Figure 1:
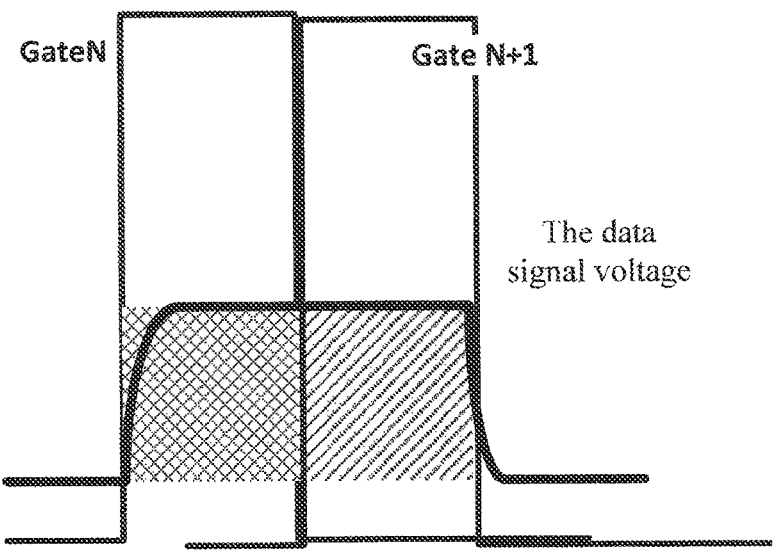
FIG. 1 schematically shows charging effects of pixel electrodes of pixel units of a liquid crystal display panel in the prior art.
Figure 2:
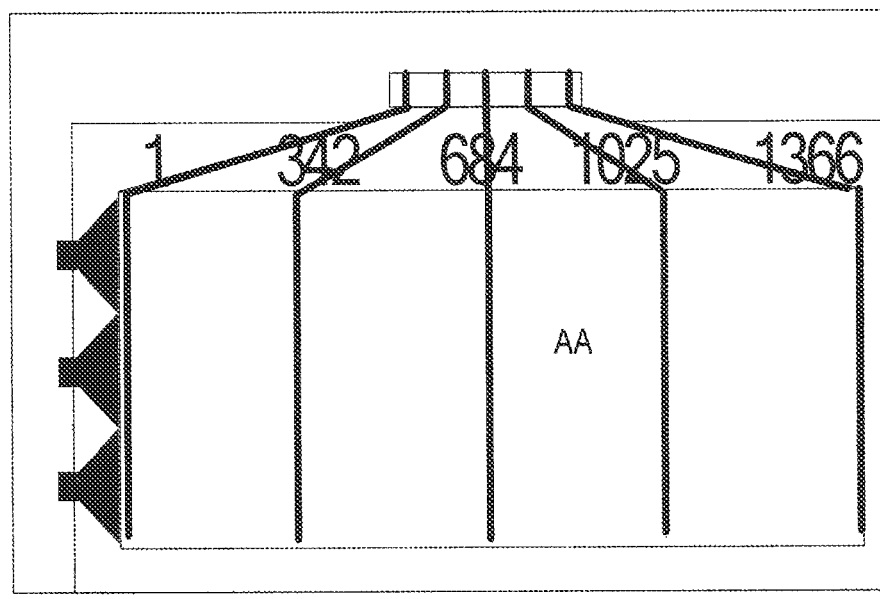
FIG. 2 schematically shows the arrangement of data lines in a fanout area and an active area of the liquid crystal display panel in the prior art.

FIG. 2 schematically shows the arrangement of data lines in a fanout area and an Active Area (AA) of a liquid crystal display panel (with 1366 columns) in the prior art in which the color shift phenomenon would occur. As shown in FIG. 2, in the active area of the liquid crystal display panel, the data lines are arranged in parallel with one another, and the date lines in a right side and a left side of the panel and the date lines in a central part thereof all have the same length and width. However, in the fanout area of the liquid crystal display panel, the data wirings (i.e., the data lines in the fanout area) are arranged in a fan shape and have different lengths, which decrease gradually from a right side and a left side of the fanout area to a central part thereof. It can be seen that, there are impedance differences among the data wirings in the fanout area, and thus the impedance differences would exist among the data lines in a right side and a left side of the whole liquid crystal display panel (including the fanout area and the active area) and the data lines in a central part thereof. In this case, when an image is displayed on the display panel, the color shift phenomenon would occur. In order to mitigate and eliminate the color shift phenomenon, a new solution is proposed according to the present disclosure, taking the degree of difficulty of the manufacturing technology and many objective restrictions (for example, the data wirings in the fanout area cannot be changed due to the limited space thereof) into consideration. Specifically, data lines with different widths which change gradually in the active area of the liquid crystal display panel are provided to substitute the traditional data lines with the same width, so as to neutralize the impedance differences of the data wirings in the fanout area. By means of which, the impedance differences among the data lines in the right side and the left side of the whole liquid crystal display panel and the data lines in the central part thereof can be reduced.

It can be seen from the prior art that, the time-delay constant $RC_{delay}$ of one data line of the liquid crystal display panel can be expressed as:

$$RC_{delay}=(R_{fanout}+R_{data})*(C_{fanout}+C_{data})$$

wherein $R_{fanout}$ is the resistance value of the data line in the fanout area, $R_{data}$ is the resistance value of the data line in the active area, $C_{fanout}$ is the capacitance value of the data line in the fanout area, and $C_{data}$ is the capacitance value of the data line in the active area.

It can be seen that, the time-delay constants $RC_{delay}$ of the data lines in the right side and the left side of the liquid crystal display panel should be reduced if the impedance differences among the data lines in the right side and the left side of the whole liquid crystal display panel and the data lines in the central part thereof need to be reduced. According to the present disclosure, since the data lines in the fanout area are not changed, the values of $R_{fanout}$ and $C_{fanout}$ are not changed. In this case, the reasonable time-delay constant $RC_{delay}$ can be obtained through changing the widths of the data lines in the active area and regulating the values of $R_{data}$ and $C_{data}$.

The present disclosure will be explained in details with reference to the embodiments and the accompanying drawings.

Embodiment 1

Figure 3:
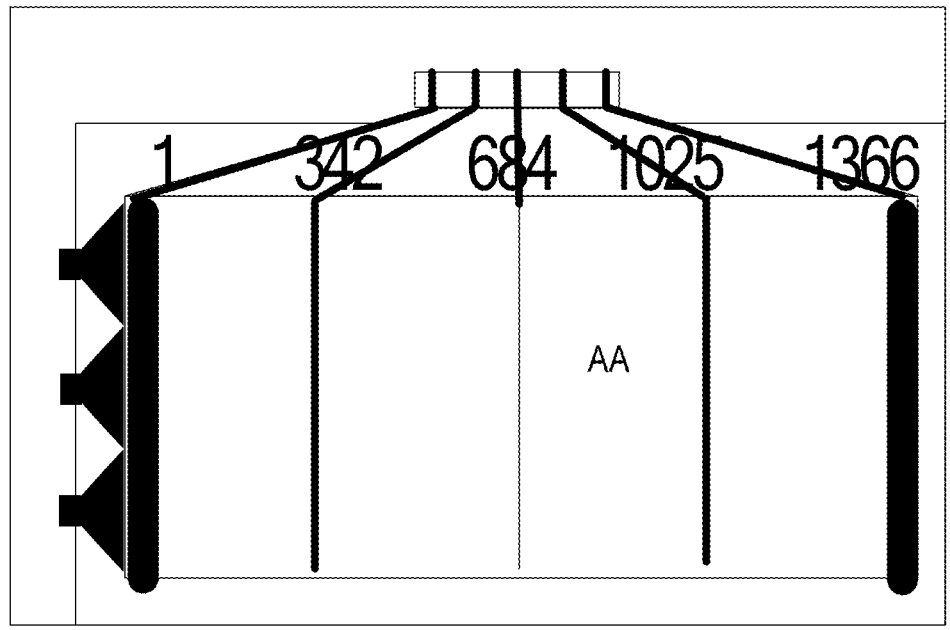
FIG. 3 schematically shows the arrangement of data lines in a fanout area and an active area of a liquid crystal display panel according to a first embodiment of the present disclosure.

FIG. 3 shows a specific embodiment of the present disclosure. According to the present disclosure, the widths of the data lines in the active area increase gradually from a central part of the active area to a right side and a left side thereof. This arrangement is mainly applicable to the situation that the value of $R_{fanout}$ of each data line in the fanout area is far less than the value of $C_{fanout}$ thereof. Under this circumstance, the resistance values $R_{data}$ of the data lines would decrease with the increasing of the widths of the data lines in the active area, and accordingly, the capacitance values $C_{data}$ of the data lines in the active area would increase. However, since the capacitance value $C_{fanout}$ of each data line in the fanout area is relatively large, the changing of $(C_{fanout}+C_{data})$ is relatively small, and thus its influence on the time-delay constant $RC_{delay}$ is small as well. From the whole point of view, the time-delay constants $RC_{delay}$ of the data lines in the right side and the left side of the liquid crystal display panel can be reduced with the increasing of the widths of the data lines in the active area, and thus the technical effect of the present disclosure can be achieved.

According to the present disclosure, preferably, the widths of the data lines in the active area increase uniformly from the central part of the active area to the right side and the left side thereof.

Embodiment 2

Figure 4:
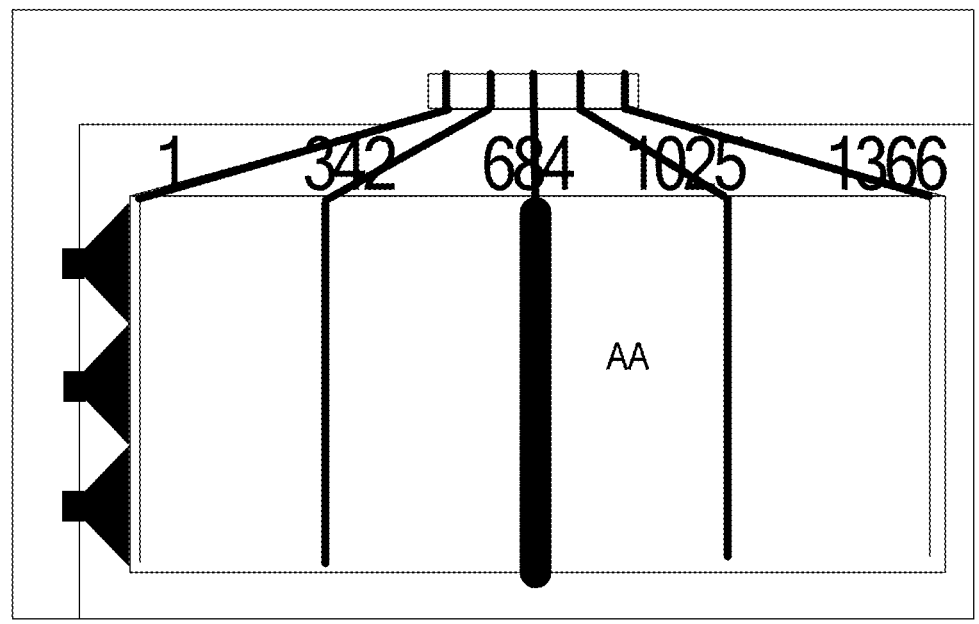
FIG. 4 schematically shows the arrangement of data lines in a fanout area and an active area of a liquid crystal display panel according to a second embodiment of the present disclosure.

FIG. 4 shows another specific embodiment of the present disclosure. According to the present disclosure, the widths of the data lines in the active area decrease gradually from a central part of the active area to a right side and a left side thereof. This arrangement is mainly applicable to the situation that the value of $R_{fanout}$ of each data line in the fanout area is far more than the value of $C_{fanout}$ thereof. Under this circumstance, the capacitance values $C_{data}$ of the data lines would decrease with the decreasing of the widths of the data lines in the active area, and accordingly, the resistance values $R_{data}$ of the data lines in the active area would increase. However, since the resistance value $R_{fanout}$ of each data line in the fanout area is relatively large, the changing of $(R_{fanout}+R_{data})$ is relatively small, and thus its influence on the time-delay constant $RC_{delay}$ is small as well. From the whole point of view, the time-delay constants $RC_{delay}$ of the data lines in the right side and the left side of the liquid crystal display panel can be reduced with the decreasing of the widths of the data lines in the active area, and thus the technical effect of the present disclosure can be achieved.

According to the present disclosure, preferably, the widths of the data lines in the active area decrease uniformly from the central part of the active area to the right side and the left side thereof.

Embodiment 3

Figure 5:
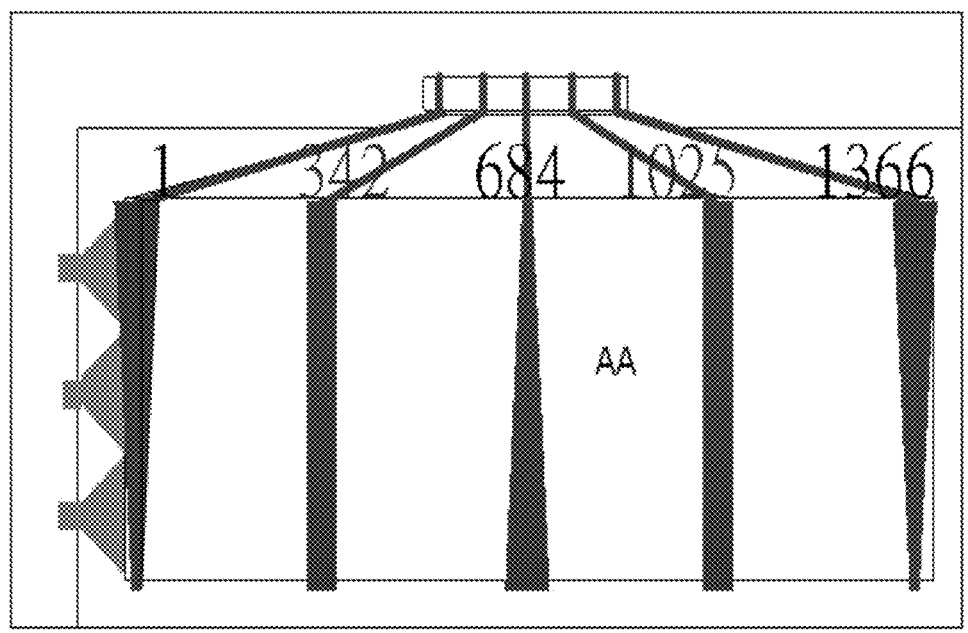
FIG. 5 schematically shows the arrangement of data lines in a fanout area and an active area of a liquid crystal display panel according to a third embodiment of the present disclosure.

FIG. 5 shows a third specific embodiment of the present disclosure. According to the present embodiment, the width of each of the data lines arranged in a right side and a left side of the active area decreases uniformly along a direction from an upper end of the active area to a lower end of the active area, while the width of each of the data lines arranged in a central part of the active area increases uniformly along the direction from the upper end of the active area to the lower end of the active area. In this case, although the width of each of the data lines arranged in the right side and the left side of the active area decreases uniformly along the direction from the upper end of the active area to the lower end thereof, for the whole data line, the capacitance value $C_{data}$ is almost unchanged, while the growth of the resistance value $R_{data}$ decreases gradually with the increasing of the length of the data line. Similarly, although the width of each of the data lines arranged in the central part of the active area increases uniformly along the direction from the upper end of the active area to the lower end thereof, for the whole data line, the capacitance value $C_{data}$ is almost unchanged while the growth of the resistance value $R_{data}$ increases gradually with the increasing of the length of the data line. Therefore, the color shift phenomenon of the liquid crystal display panel can be regulated with the arrangements of the data lines.

In a word, according to the present disclosure, the impedance difference between the data lines in the right side and the left side of the liquid crystal display panel and the data lines in the central part thereof can be reduced through regulating the widths of the data lines in the active area of the liquid crystal display panel, and thus the color shift phenomenon of the liquid crystal display panel can be alleviated.

Accordingly, the present disclosure further provides a method for manufacturing the above liquid crystal display panel, comprising the following steps: arranging data lines of different widths in parallel with one another in an active area; and arranging data wirings in a fanout area, so that one end of each data wiring is connected with an output end of said data driving module, and the other end thereof is connected with a data line of said active area.

According to a specific embodiment of the present disclosure, the widths of the data lines in said active area increase gradually from a central part of the active area to a right side and a left side of the active area.

Preferably, the widths of the data lines in said active area increase uniformly.

According to a specific embodiment of the present disclosure, the widths of the data lines in said active area decrease gradually from a central part of the active area to a right side and a left side of the active area.

Preferably, the widths of the data lines in said active area decrease uniformly.

According to a specific embodiment of the present disclosure, the width of each of the data lines arranged in a right side and a left side of the active area decreases gradually along a direction from an upper end of the active area to a lower end of the active area, while the width of each of the data lines arranged in a central part of the active area increases gradually along the direction from the upper end of the active area to the lower end of the active area.

Preferably, the width of each of the data lines arranged in the right side and the left side of the active area decreases uniformly, and the width of each of the data lines arranged in the central part of the active area increases uniformly.

The above embodiments are described only for better understanding, rather than restricting, the present disclosure. The liquid crystal display panels designed by different manufacturers can have different structures. Any changes or substitutes, as well as amendments to the implementing forms or details readily conceivable for any one skilled in the art within the technical scope disclosed by the present disclosure shall be covered by the scope of the present disclosure.

The invention claimed is:

1. A liquid crystal display panel, comprising:
   a data driving module;
   data lines arranged in an active area in parallel with one another; and
   data wirings arranged in a fanout area, one end of each data wiring being connected with an output end of said data driving module, the other end thereof being connected with a data line of said active area,
   wherein the data lines in said active area have different widths,
   wherein the width of each of the data lines arranged in a right side and a left side of the active area decreases gradually along a direction from an upper end of the active area to a lower end of the active area, while the width of each of the data lines arranged in a central part of the active area increases gradually along the direction from the upper end of the active area to the lower end of the active area.

2. The liquid crystal display panel according to claim 1, wherein the width of each of the data lines arranged in the right side and the left side of the active area decreases uniformly, and the width of each of the data lines arranged in the central part of the active area increases uniformly.

3. A method for manufacturing a liquid crystal display panel, comprising the following steps:
   arranging data lines of different widths in parallel with one another in an active area; and
   arranging data wirings in a fanout area, so that one end of each data wiring is connected with an output end of a data driving module of the liquid crystal display panel, and the other end thereof is connected with a data line of said active area,
   wherein the width of each of the data lines arranged in a right side and a left side of the active area decreases gradually along a direction from an upper end of the active area to a lower end of the active area, while the width of each of the data lines arranged in a central part of the active area increases gradually along the direction from the upper end of the active area to the lower end of the active area.

4. The method according to claim 3, wherein the width of each of the data lines arranged in the right side and the left side of the active area decreases uniformly, and the width of each of the data lines arranged in the central part of the active area increases uniformly.

* * * * *